United States Patent
Lee

(10) Patent No.: US 7,748,285 B2
(45) Date of Patent: Jul. 6, 2010

(54) PRECISION MOTION TRANSDUCER UTILIZING ELASTICITY RATIO

(75) Inventor: Kwen-Jin Lee, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 1166 days.

(21) Appl. No.: 11/165,130

(22) Filed: Jun. 24, 2005

(65) Prior Publication Data
US 2006/0156567 A1    Jul. 20, 2006

(30) Foreign Application Priority Data
Dec. 30, 2004    (TW)    ................... 93141321

(51) Int. Cl.
*F16H 21/44* (2006.01)
*F16H 21/54* (2006.01)
*F16H 25/18* (2006.01)
*B23Q 16/00* (2006.01)

(52) U.S. Cl. ......................................... 74/110; 33/568

(58) Field of Classification Search ................... 74/110; 33/568; 267/174, 175, 177, 179, 28
See application file for complete search history.

(56) References Cited
U.S. PATENT DOCUMENTS

| | | | |
|---|---|---|---|
| 3,256,740 A * | 6/1966 | Tate et al. ..................... | 73/701 |
| 4,424,630 A * | 1/1984 | Aceti ........................... | 33/558 |
| 4,887,804 A * | 12/1989 | Ohtsuka ....................... | 269/73 |
| 5,187,876 A | 2/1993 | Hatheway | |
| 6,016,097 A * | 1/2000 | Gardner ....................... | 338/47 |
| 2004/0163450 A1* | 8/2004 | Gweon et al. ................. | 73/105 |

* cited by examiner

*Primary Examiner*—Thomas R Hannon
*Assistant Examiner*—Justin Krause
(74) *Attorney, Agent, or Firm*—Birch, Stewart, Kolasch & Birch, LLP

(57) ABSTRACT

A precision motion transducer is provided in the present invention. The precision motion transducer is provided with a first elastic body. An end of the first elastic body is connected to an end of a second elastic body, while the other end of the second elastic body is fixed to a base via a fixing means. A motion input means is connected to the other end of the first elastic body for inputting motion inputs, while a motion output means is provided at a location where the first elastic body is connected with the second elastic body for outputting motion outputs. The modulus of elastic of the first elastic body is smaller than the modulus of elastic of the second elastic body, whereby relatively large motion inputs can be converted to more precise and finer motion inputs, so as to attain precise positioning control.

11 Claims, 4 Drawing Sheets

PRECISION MOTION TRANSDUCER UTILIZING ELASTICITY RATIO

FIELD OF THE INVENTION

The present invention relates to a precision motion transducer, and more particularly, to a precision motion transducer for performing a precision motion conversion utilizing an elasticity ratio between a plurality of elastic bodies.

BACKGROUND OF THE INVENTION

Recently, micro-scale manufacturing technologies, even nano-scale manufacturing technologies have been gradually applied in various technical fields such as semiconductor, optoelectronics, biomedicine, precision machine and the like, and hence a positioning control technology with high accuracy and fine adjustment which can fulfill requirements of various precision processes is desirable. Moreover, in precision measurement instruments such as optical measurement instruments, it is necessary to perform accurate position adjustments to the instruments to achieve desired performances or functions. For example, in testing instruments for a solid immerse lens (SIL) near-field optical head, a precise distance adjustment is required in order to observe near-field optical phenomenon, such as evanescent wave.

At the present day, a micrometer, a precision motor, a piezo-actuator, a magnetic actuator or the like is generally used as a positioning control device of the precision manufacturing equipments or the precision measurement instruments. However, these positioning control devices are restricted to their own structures and therefore have many drawbacks, such as being unable to achieve a more accurate positioning control, slow positioning speed, and high manufacturing cost etc.

In view of the above-described requirements and drawbacks, U.S. Pat. No. 5,187,876 discloses a precision motion transducer which can convert relatively large motion inputs into relatively small motion outputs. As shown in FIG. 1, the precision motion transducer 8 comprises: a deformable elastic transducer body 81 provided with two cantilever beams 811, 812; a micrometer 82 fixed on the cantilever beam 811 for applying calibrated and known motions to an end portion of the cantilever beam 812; a fixing means 83 for fixing the elastic transducer body 81 to a foundation of a equipment; a means 84 for blocking and directing motions, including cutout patterns 841, 842 formed in the elastic transducer body 81, the cutout patterns being designed for directing the motion of the elastic transducer body 81 to an object body to be moved in a desired direction; and an output means 85 for outputting the converted motion to the object body. A known motion is inputted to the deformable elastic transducer body 81 by the micrometer 82 to produce a deformation between the cantilever beams 811, 812. Since the designed cutout patterns 841, 842 have been formed in the elastic transducer body 81 in advance, the deformation can be converted into a motion output at a predetermined location in a predetermined direction (i.e. the shear direction). By designing the sizes of the cantilever beams 811, 812, the rigidity of the elastic transducer body 81, and the sizes and the positions of the cutout patterns 841, 842, a precision motion transducer 8 with a desirable input/output conversion ratio can thus be obtained.

However, though the above-described precision motion transducer 8 is provided with a very high conversion ratio (i.e. with a capability to perform a very fine motion control) and a relatively simple structure, the moving distance of the motion input and/or motion output thereof is restricted to be within a very small range. Moreover, since the motion is converted via the elastic deformation in the shear direction, the converted motion output may not entirely moved toward a desired direction, even the elastic transducer body 81 being formed with the cutoff patterns 841, 842.

Accordingly, there is an urgent need to provide a precision motion transducer, with a simple structure and a high conversion ratio, whereby relatively large motion inputs can be converted to extremely precise motion outputs, while the motion outputs can be completely moved toward a desired direction.

SUMMARY OF THE INVENTION

In the light of forgoing drawbacks, an objective of the present invention is to provide a precision motion transducer with a simple structure which can be applied in various instruments.

Another objective of the present invention is to provide a precision motion transducer utilizing elasticity ratio, which is provided with a high conversion ratio to allow relatively large motion inputs to be converted to extremely precise motion outputs.

Still another objective of the present invention is to provide a precision motion transducer utilizing elasticity ratio, which can output linear motions or rotational motions in a desired direction.

In accordance with the above and other objectives, a precision motion transducer is proposed according to one aspect of the present invention, which comprises: a first elastic body with a first modulus of elasticity, provided with a first end and a second end; a second elastic body with a second modulus of elasticity which is larger than the first modulus of elasticity, the second elastic body being provided with a fixed portion and a free portion, the free portion being attached to the second end of the first elastic body; a fixing means for fixing the fixed portion of the second elastic body to a base; a motion input means for inputting motion inputs to the first end of the first elastic body; and a motion output means provided at a location where the first elastic body and the second elastic body are connected with each other for outputting motion outputs which are converted from the motion inputs according to an elasticity ratio between the modulus of elasticity of the first elastic body and the modulus of elasticity of the second elastic body. When a motion is inputted from the motion input means and a force balance is established between the first elastic body and the second elastic body, the first elastic body is caused to have a deformation which is much larger than the deformation of the second elastic body because the first modulus of elasticity is smaller than the second modulus of elasticity. Since the motion output means is provided at the location where the first elastic body and the second elastic body are connected with each other, a motion output which is proportionally smaller than the motion input can be outputted from the motion output means.

Preferably, the precision motion transducer further comprises a damper, wherein one end of the damper is attached to the motion input means, and the other end of the damper is attached to the base. Thus, the motion output can be more stabilized during the movement or after reaching the target position via the damping effect of the damper, so as to avoid vibrations which would otherwise adversely influence the positioning. Thereby, a desired motion quantity can be achieved more swiftly.

In a preferred embodiment of the present invention, the second elastic body is a spring, wherein one end of the spring is the free portion, and the other end of the spring is the fixed portion, wherein the second modulus of elasticity refers to a modulus of elasticity of the one end with respect to the other end.

In another preferred embodiment of the present invention, the second elastic body is a cantilever beam, wherein one end portion of the cantilever beam is the free portion, and the other end portion of the cantilever beam is the fixed portion, wherein the second modulus of elasticity refers to a modulus of elasticity of the one end portion with respect to the other end portion.

In still another preferred embodiment of the present invention, the second elastic body is an ends-fixed beam, wherein a central portion of the ends-fixed beam is the free portion, and two end portions of the ends-fixed beam are the fixed portions, wherein the second modulus of elasticity refers to a modulus of elasticity of the central portion with respect to the two end portions.

In yet another preferred embodiment of the present invention, the second elastic body is a beam with at least three end portions, wherein a central portion of the beam is the free portion, and the at least three end portions are the fixed portions, wherein the second modulus of elasticity refers to a modulus of elasticity of the central portion with respect to the fixed end portions.

In still another preferred embodiment of the present invention, the second elastic body is a disc, wherein a central portion of the disc is the free portion, and a circumferential portion of the disc is the fixed portion, wherein the second modulus of elasticity refers to a modulus of elasticity of the central portion with respect to the circumferential portion.

Preferably, the first elastic body is a spring, wherein one end of the spring is the first end, and the other end of the spring is the second end, wherein the first modulus of elasticity refers to a modulus of elasticity of the one end with respect to the other end.

In the present invention, the motion input and/or the motion output may be a linear motion. Alternatively, the motion input and/or the motion output may be a rotational motion.

In the present invention, the motion input means may include an actuation means such as micrometer, motor, piezo-actuator, voice coil, linear actuator such as hydraulic linear actuator (e.g. hydraulic cylinder) or air linear actuator (e.g. air cylinder), or the like. Thus, the motion can be inputted manually through the micrometer, or the motion can be inputted automatically through the motor, piezo-actuator etc.

Preferably, the precise motion transducer further comprises a motion output feedback device for monitoring the motion output and transmitting a feedback signal corresponding to the motion output. Thus, an operator can adjust the motion input while monitoring the actual motion output, so that the object body can be manually adjusted to a desired position. Alternatively, the motion output means of the precision motion transducer can be automatically controlled according to the feedback signal, so that the object body can be automatically adjusted to a desired position.

From the above description, the modulus of elasticity of the first elastic body is smaller than the modulus of elasticity of the second elastic body, while the fixed portion of the second elastic body is fixed to the base, and the free portion of the second elastic body is attached to the second end of the first elastic body. Therefore, when a motion input is inputted to the first end of the first elastic body, the connecting portion between the free portion of the second elastic body and the second end of the first elastic body would move responsively according to the ratio of the second modulus of elasticity to the first modulus of elasticity. In other words, as the ratio of the first modulus of elasticity to the second modulus of elasticity becomes smaller, the motion of the connecting portion between the free portion of the second elastic body and the second end of the first elastic body becomes relatively smaller. Thus, by appropriately adjusting the ratio of the second modulus of elasticity to the first modulus of elasticity, a precision motion conversion can be performed with this simple structure, so as to achieve a precise positioning control as desired.

Furthermore, because the elasticity ratio between two elastic bodies is utilized to perform the motion conversion according to the present invention without involvement of a shear force, the motion output can hence be outputted in a desired direction.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention will now be described in detail by the following specific embodiments with reference of the drawings. Other advantages and effects will be readily appreciated by those skilled in the art via the detailed description disclosed in this specification. The present invention can be practiced by other embodiments, and should therefore cover various modifications and variations made to the herein-described details of the present invention, provided they fall within the scope of the present invention as defined in the following appended claims.

First Embodiment

Figure 1:
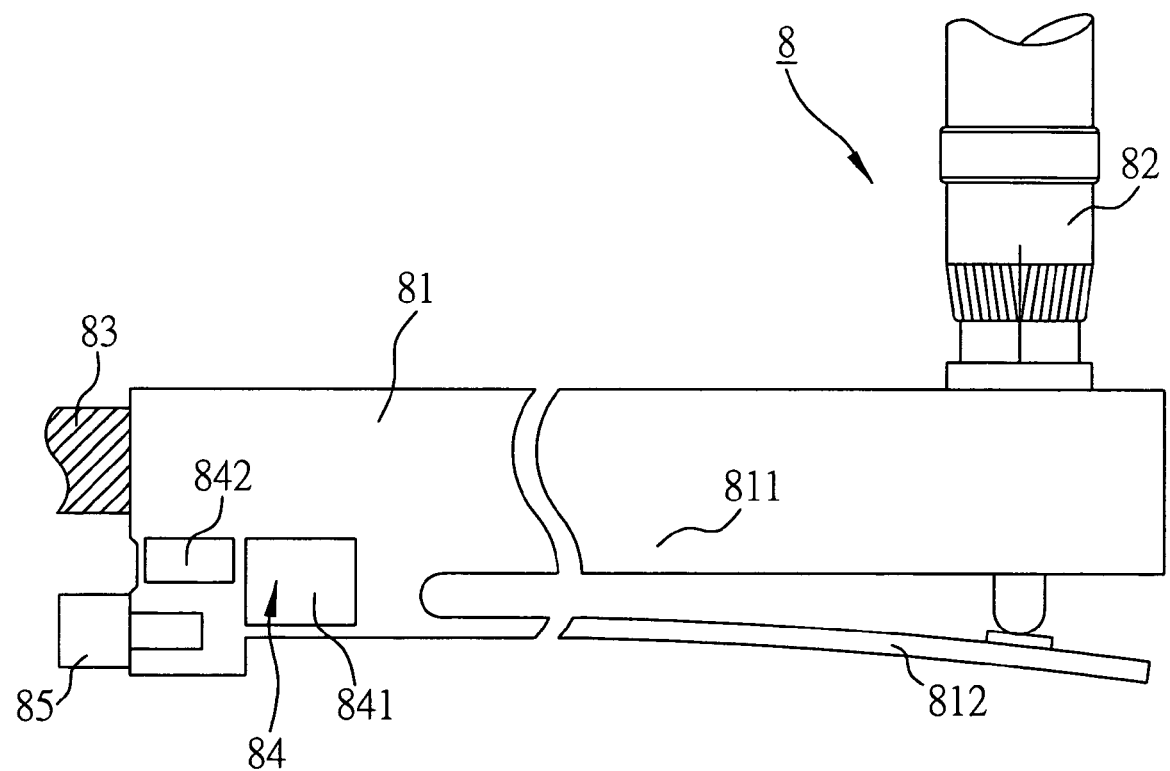
FIG. 1 is a side view showing a precision motion transducer according to a conventional technology.
Figure 2:
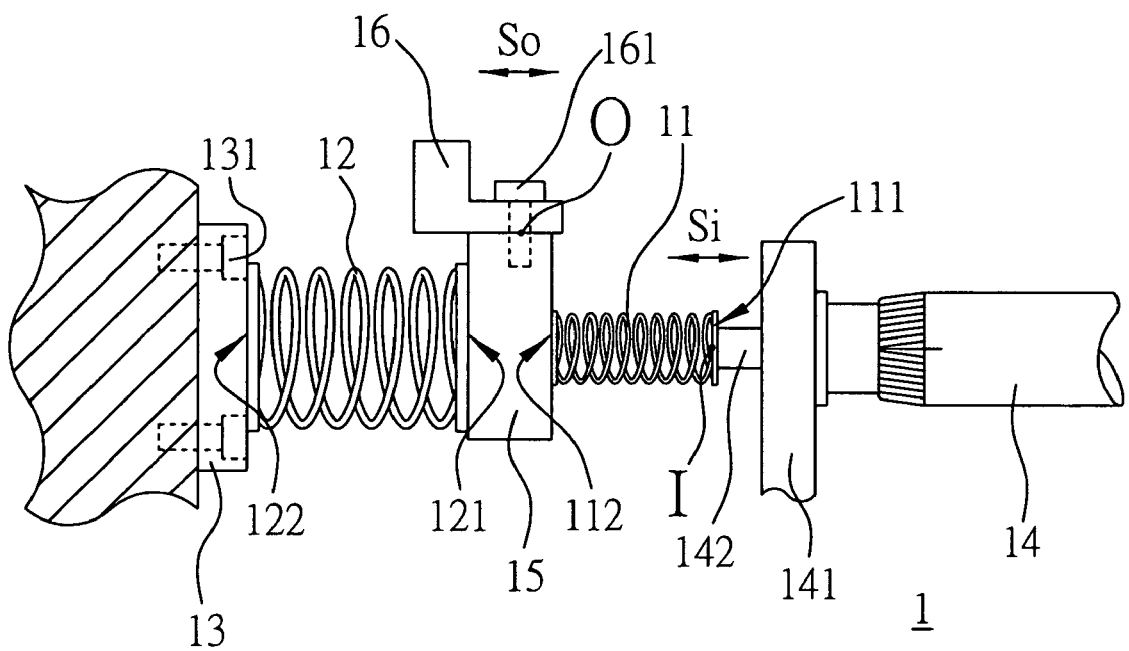
FIG. 2 is a side view showing a precision motion transducer according to the first embodiment of the present invention.

FIG. 2 is a side view showing a precision motion transducer according to the first embodiment of the present invention. As shown in FIG. 2, the precision motion transducer 1 comprises: a first spring 11 provided with a first end 111 and a second end 112; a second spring 12 provided with a free portion 121 and a fixed portion 122; a fixing means 13 for fixing the fixed portion 122 of the second spring 12 to a base (without numeral) by a plurality of screws 131; a micrometer 14 used as a motion input means for inputting linear motion, the micrometer 14 being fixed onto the base by a fixing means 141; a connecting means 15 for connecting the free portion 121 of the second spring 12 with the second end 112 of the first spring 11; and a motion output means 16 fixed onto the connecting means 15 by screws 161. The first spring 11 is provided with a first modulus of elasticity $\lambda 1$, and the second spring 12 is provided with a second modulus of elasticity $\lambda 2$.

When the micrometer 14 is rotated, the motion input point I at the first end 111 of the first spring 11 is caused to move by the movement of a head 142 of the micrometer 14, to thereby produce a linear motion input Si. The first spring 11 is thus compressed to produce a compression elastic force, so that the second end 112 thereof presses against the connecting means 15 as well as the free portion 121 of the second spring 12 to render the free portion 121 of the second spring 12 to have an elastic displacement. Thereby, a motion output point O at the motion output means 16 would have a linear motion output So correspondingly. Since the first spring 11 is compressed by a total distance (Si−So), the compression elastic force F1 produced at the second end 112 of the first spring 11 can be represented by the following equation.

$$F1=\lambda 1 \cdot (Si-So) \qquad \text{equation (1)}$$

Since the second spring 12 is compressed by a total distance So, the compression elastic force F2 produced at the free portion 121 of the second spring 12 can be represented by the following equation.

$$F2=\lambda 2 \cdot So \qquad \text{equation (2)}$$

Since a force balance should be established between the compression elastic force F1 and the compression elastic force F2, the relationship between the motion input Si and the motion output So can be represented by the following equation.

$$Si=So \cdot ((\lambda 1+\lambda 2)/\lambda 1)) \qquad \text{equation (3)}$$

Accordingly, a desired motion conversion ratio can be obtained by appropriately setting the ratio between the second modulus of elasticity $\lambda 2$ and the first modulus of elasticity $\lambda 1$. The ratio of the second modulus of elasticity $\lambda 2$ to the first modulus of elasticity $\lambda 1$ is preferably larger than 1(namely, the second modulus of elasticity $\lambda 2$ is preferably one time larger than the first modulus of elasticity $\lambda 1$), more preferably larger than 20 (namely, the second modulus of elasticity $\lambda 2$ is more preferably 20 times larger than the first modulus of elasticity $\lambda 1$), and even more preferably larger than 100 (namely, the second modulus of elasticity $\lambda 2$ is even more preferably 100 times larger than the first modulus of elasticity $\lambda 1$), whereby the precision motion transducer 1 can be provided with a higher motion conversion ratio, to convert the motion input Si to a more precise and finer motion output So. On the other hand, if the ratio of the second modulus of elasticity $\lambda 2$ to the first modulus of elasticity $\lambda 1$ is excessively large, a motion output may not be outputted appropriately. From this point of view, the ratio of the second modulus of elasticity $\lambda 2$ to the first modulus of elasticity $\lambda 1$ is preferably smaller than 1000, for example.

The first spring 11 and/or the second spring 12 may be one of the various springs, such as cylindroid helical-coil compression spring, conoid helical-coil compression spring, plural coaxial coils spring, plate spring or the like. Furthermore, other kinds of elastic body with an appropriate modulus of elasticity may be used to replace the first spring 11 and/or the second spring 12.

Moreover, though a micrometer is used as the motion input means 14 in the present embodiment, the present invention is not limited to this, and other motion input means, such as a motor system consisting of a stepping motor for outputting linear motion, piezo-actuator, magnetic coil, voice coil, or linear actuator such as hydraulic linear actuator or air linear actuator etc., may be used as well. For example, in the case of using the motor system consisting of a stepping motor as the motion input means 14, the motion input can be automatically controlled, and thus the precision motion transducer according to the present embodiment can be applied in automatic instruments. Additionally, the precision motion transducer according to the present embodiment can further comprises a motion output feedback device, which measures the actual motion output by a distance measurement device, such as a laser distance measuring sensor, and thus the actual motion output can be shown on a monitor to allow operators to check it. Alternatively, an actual motion output signal representing the actual motion output can be returned to a controller of an automatic motion input means, such as motor, from the motion output feedback device, to allow the controller to adjust the motion input automatically based on the actual motion output signal.

Second Embodiemnt

Figure 3:
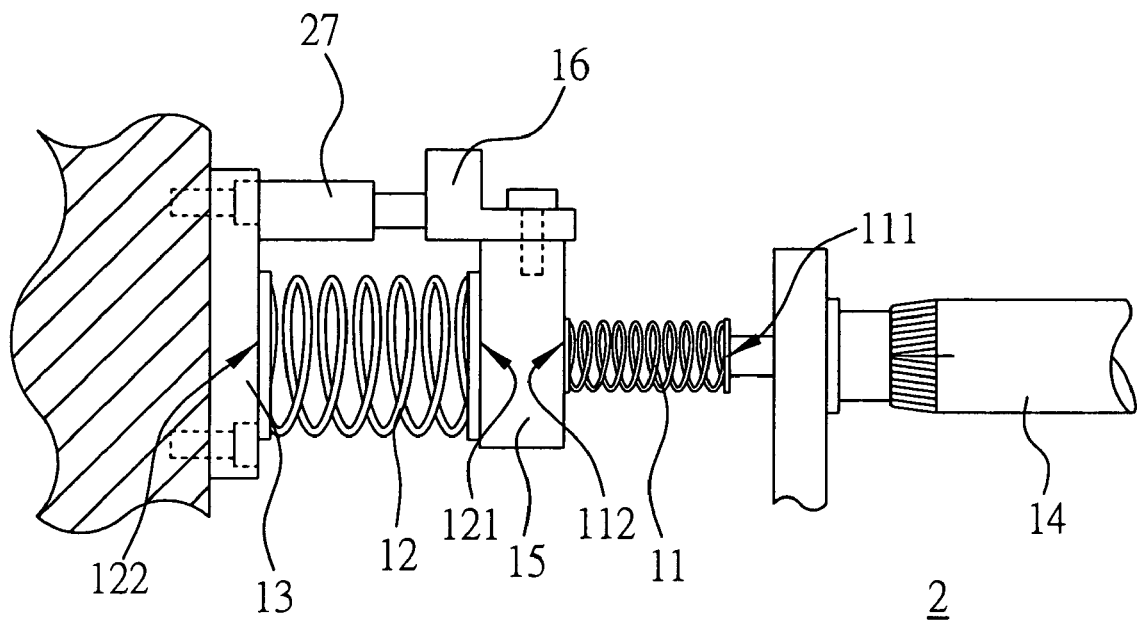
FIG. 3 is a side view showing a precision motion transducer according to the second embodiment of the present invention.

FIG. 3 is a side view showing a precision motion transducer according to the second embodiment of the present invention. The precision motion transducer according to the second embodiment of the present invention is a modification of the precision motion transducer according to the first embodiment, and hence the same structures and functions will not be described in detail redundantly. In FIG. 3, same or similar structures are represented by same numerals as in FIG. 2.

As shown in FIG. 3, the precision motion transducer 2 comprises: a first spring 11, a second spring 12, a fixing means 13 for fixing the second spring 12 to a base, a micrometer 14 used as a motion input means, a connecting means 15 for connecting the free portion 121 of the second spring 12 with the second end 112 of the first spring 11, a motion output means 16 fixed onto the connecting means 15, and a damper 27 interposed between the motion output means 16 and the fixing means 13, wherein one end of the damper 27 is attached to the motion output means 16,and the other end of the damper 27 is attached to the fixing means 13. The first spring 11 is provided with a first modulus of elasticity $\lambda 1$, and the second spring 12 is provided with a second modulus of elasticity $\lambda 2$.

Because the damper 27 can provide a damping effect while the motion input means 14 inputs the motion to stabilize the whole driving system of the precision motion transducer 2, so as to suppress the first spring 11, the second spring 12, and the motion output means 16 from producing any unnecessary vibration. Thus, it is possible to reach a positioned target more accurately and swiftly.

Third Embodiment

Figure 4:
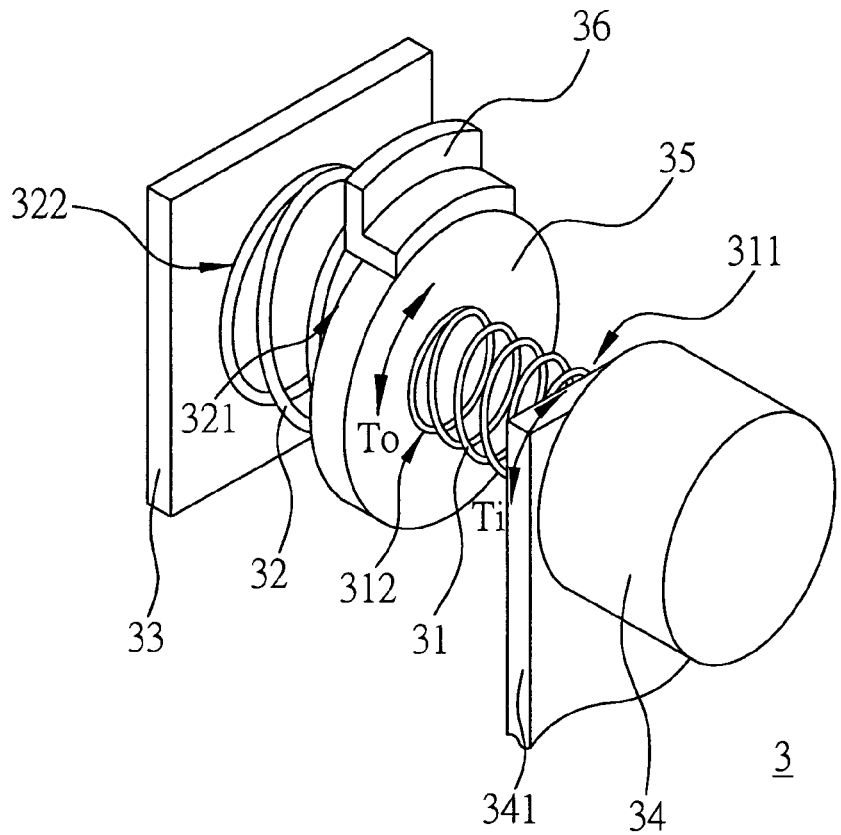
FIG. 4 is a side view showing a precision motion transducer according to the third embodiment of the present invention.

FIG. 4 is a perspective view showing a precision motion transducer according to the third embodiment of the present invention. The precision motion transducer according to the third embodiment of the present invention is a modification of the precision motion transducer according to the first embodiment, and hence the same structures and functions will not be described in detail redundantly, only the differences between the first and third embodiments will be described.

As shown in FIG. 4, the precision motion transducer 3 comprises: a first spring 31 provided with a first end 311 and a second end 312; a second spring 32 provided with a free portion 321 and a fixed portion 322; a fixing means 33 for fixing the fixed portion 322 of the second spring 32 to a base (without numeral); a stepping motor 34 used as a motion input means for inputting rotational motions, the stepping motor 34 being fixed onto the base by a fixing means 341; a connecting means 35 for connecting the free portion 321 of the second spring 32 with the second end 312 of the first spring 31; and a motion output means 36 fixed onto the connecting means 35 for outputting rotational motions. The first spring 31 is provided with a first modulus of elasticity λ3 with respect to rotational motions, and the second spring 32 is provided with a second modulus of elasticity λ4 with respect to rotational motions.

When the stepping motor 34 is actuated, the first end 311 of the first spring 31 is driven by an output end of the stepping motor 34 to produce a rotational motion input (angular motion input) Ti. The first spring 31 is thus twisted to produce a torsional elastic force, so that the second end 312 thereof would apply a torsion force toward the same direction as the rotation direction of the stepping motor 34, to render the free portion 321 of the second spring 32 to have a rotational elastic displacement. Thereby, the connecting means 35 and the motion output means 36 would have a rotational motion output (angular motion output) To correspondingly. Since the first spring 31 is twisted with a total angle (Ti−To), the torsion elastic force F3 produced at the second end 312 of the first spring 31 can be represented by the following equation.

$$F3 = \lambda 3 \cdot (Ti - To) \quad \text{equation (4)}$$

Since the second spring 32 is twisted with a total angle To, the torsional elastic force F4 produced at the free portion 321 of the second spring 32 can be represented by the following equation.

$$F4 = \lambda 2 \cdot To \quad \text{equation (5)}$$

Since a force balance should be established between the torsional elastic force F3 and the torsional elastic force F4, the relationship between the rotational motion input Ti and the rotational motion output To can be represented by the following equation.

$$Ti = To \cdot ((\lambda 3 + \lambda 4)/\lambda 3) \quad \text{equation (6)}$$

Similar to the first embodiment, a desired motion (angle) conversion ratio can be obtained by appropriately setting the ratio between the second modulus of elasticity λ4 and the first modulus of elasticity λ3 of the precision motion transducer 3 according to the present embodiment. The ratio of the second modulus of elasticity λ4 to the first modulus of elasticity λ3 is preferably larger than 1, more preferably larger than 20, and still more preferably larger than 100. On the other hand, the ratio of the second modulus of elasticity λ4 to the first modulus of elasticity λ3 is preferably smaller than 1000, for example. Thereby, the precision motion transducer 3 is capable of output motions (angles) converted by appropriate conversion ratios.

Moreover, the first spring 31 and/or the second spring 32 may be selected from various springs as required, such as cylindroid helical-coil torsion spring, conoid helical-coil torsion spring or the like. Furthermore, other kinds of elastic body, such as a torsion bar, with an appropriate modulus of elasticity may be used to replace the first spring 31 and/or the second spring 32.

Moreover, though a stepping motor is used as the motion input means 34 in the present embodiment, the present invention is not restricted to this, and other motion input means, such as a manual wheel, may be used otherwise.

Fourth Embodiment

Figure 5:
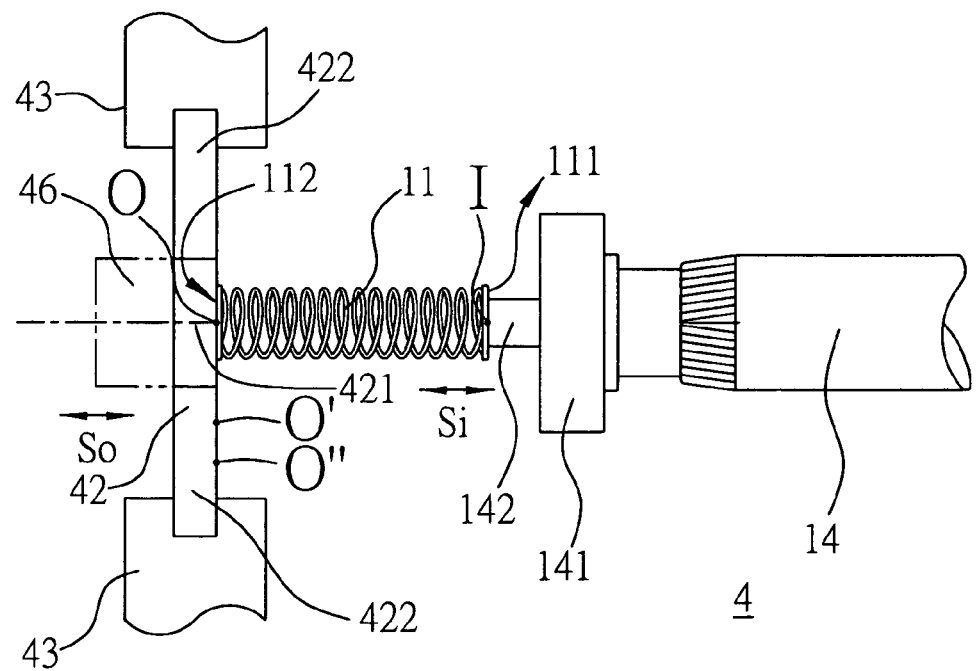
FIG. 5 is a side view showing a precision motion transducer according to the fourth embodiment of the present invention.

FIG. 5 is a side view showing a precision motion transducer according to the fourth embodiment of the present invention. The precision motion transducer according to the fourth embodiment of the present invention is a modification of the precision motion transducer according to the first embodiment, and hence the same structures and functions will not be described in detail redundantly. In FIG. 5, same or similar structures are represented by same numerals as in FIG. 2.

As shown in FIG. 5, in the precision motion transducer 4, an ends-fixed beam 42 is used to replace the second spring 12 in the first embodiment. In the ends-fixed beam 42, a central portion 421 is used as the free portion, and two end portions 422 are used as the fixed portions. There are fixing means 43 respectively provided at the two end portions of the ends-fixed beam 42, so as to respectively fix the fixed portions 422 of the ends-fixed beam 42 onto a base (not shown). The second end 112 of the first spring 11 is directly butted against and/or attached to the central portion 421 of the ends-fixed beam 42. The motion output means 46 is fixed onto the central portion 421 so as to output the converted linear motion.

The central portion (free portion) 421 of the ends-fixed beam 42 is provided with a second modulus of elasticity λ5 with respect to the two fixed portions 422, wherein the second modulus of elasticity λ5 is larger than the first modulus of elasticity λ1 of the first spring 11. Thereby, when a linear motion input Si is inputted to the first end 111 of the first spring 11 by the motion input means 14, the motion input Si can be converted to a motion output So according to the following equation.

$$Si = So \cdot ((\lambda 1 + \lambda 5)/\lambda 1)) \quad \text{equation (7)}$$

Generally, the ends-fixed beam 42 is provided with a modulus of elasticity larger than that of common springs. Therefore, the precision motion transducer 4 according to the present embodiment can output a more precise and finer motion with a higher conversion ratio.

Though it is described that the first spring 11 is directly butted against and/or attached to the central portion 421 of the ends-fixed beam 42 in the present embodiment, the present invention is not limited to this, and the first spring 11 may be connected to the central portion 421 via a connecting means (not shown) otherwise.

Moreover, though it is described in the present embodiment that the motion output means 46 is mounted on the central portion 421 of the ends-fixed beam 42 (namely, the motion output means 46 is mounted while its central line being aligned with the motion output point O), the present invention is not limited to this, and the motion output means 46 may be mounted on a location shifted from the central portion 421 toward any one of the end portions 422 by a certain distance otherwise. For example, the motion output means 46 may be mounted with its central line aligned with motion output points O' or O''. Thus, a precision motion transducer with a much higher conversion ratio can be obtained, so as to perform a much more precise positioning control.

Moreover, though it is described in the present embodiment that the ends-fixed beam comprising two end poprtions is used as the second elastic body, the present invention is not limited to this. For example, a beam which is provided with at least three fixed ends, such as a beam with three fixed ends or a beam with four fixed ends, may be used as the second elastic body, wherein the central portion of the beam is used as the free portion, and the at least three fixed ends are used as the fixed portions, wherein the second modulus of elasticity refers to a modulus of elasticity of the central portion with respect to the three fixed portions. Additionally, a disc may be used as the second elastic body as well, wherein the central portion of the disc is used as the free portion, and a circumferential portion of the disc is used the fixed portion, wherein the second modulus of elasticity refers to a modulus of elasticity of the central portion with respect to the circumferential portion. The embodiment of using the beam with at least three fixed ends as the second elastic body and the embodiment of using the disc as the second elastic body are very similar to the present embodiment, and thus further description thereof will not be given.

Fifth Embodiment

Figure 6:
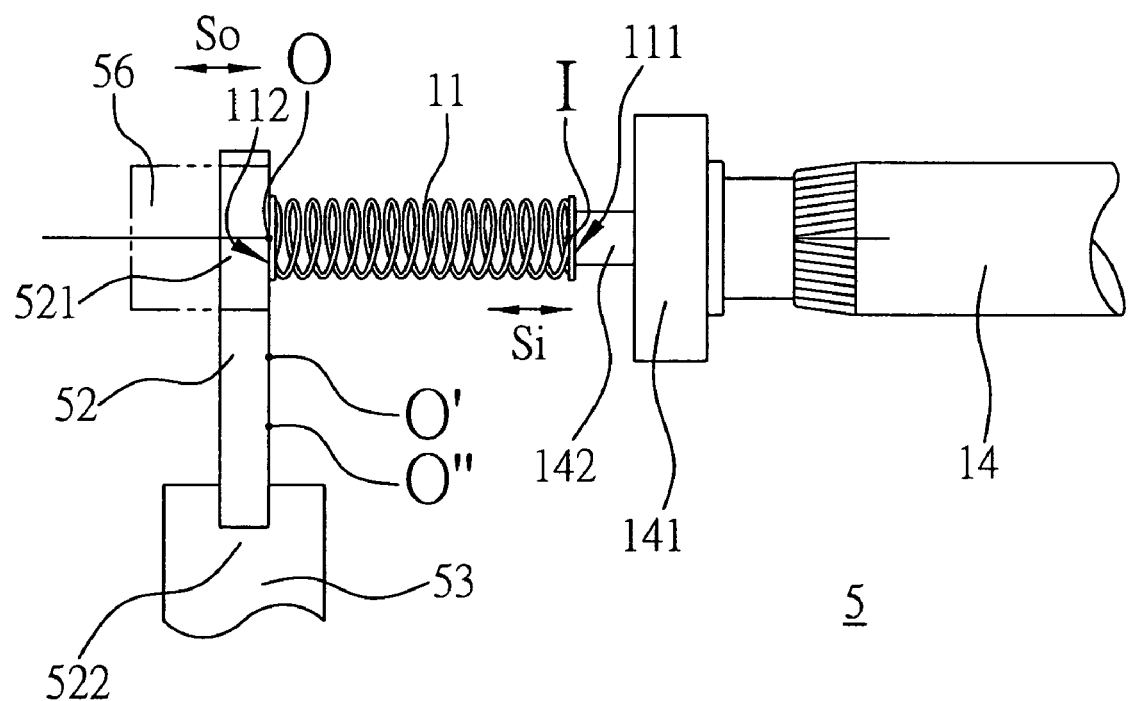
FIG. 6 is a side view showing a precision motion transducer according to the fifth embodiment of the present invention.

FIG. 6 is a side view showing a precision motion transducer according to the fifth embodiment of the present invention. The precision motion transducer according to the fourth embodiment of the present invention is a modification of the precision motion transducer according to the first embodiment, and hence the same structures and functions will not be described in detail redundantly. In FIG. 6, same or similar structures are represented by same numerals as in FIG. 2.

As shown in FIG. 6, in the precision motion transducer 5, a cantilever beam 52 is used to replace the second spring 12 in the first embodiment, wherein one end portion 521 of the cantilever beam 52 is used as the free portion, and the other end portion 522 of the cantilever beam 52 is used as the fixed portion. There is a fixing means 53 provided at the end portion 522 of the cantilever beam 52, so as to fix the end portion 522 of the cantilever beam 52 onto a base (not shown). According to the present invention, the second end 112 of the first spring 11 is directly butted against and/or attached to the end portion 521 of the cantilever beam 52. The motion output means 56 is fixed onto the end portion 521 so as to output the converted linear motion.

The end portion (free portion) 521 of the cantilever beam 52 is provided with a second modulus of elasticity $\lambda 6$ with respect to the end portion 522, wherein the second modulus of elasticity $\lambda 6$ is larger than the first modulus of elasticity $\lambda 1$ of the first spring 11. Thereby, when a linear motion input Si is inputted to the first end 111 of the first spring 11 by the motion input means H, the motion input Si can be converted to a motion output So according to the following equation.

$$Si=So\cdot((\lambda 1+\lambda 6)/\lambda 1)) \qquad \text{equation (8)}$$

Generally, the cantilever beam 52 is provided with a modulus of elasticity larger than that of common springs. Therefore, the precision motion transducer 5 according to the present embodiment can output a more precise and finer motion with a higher conversion ratio.

Though it is described that the first spring 11 is directly butted against and/or attached to the end portion 521 of the cantilever beam 52 in the present embodiment, the present invention is not limited to this, and the first spring 11 may be connected to the central portion via a connecting means (not shown) otherwise.

Moreover, though it is described in the present embodiment that the motion output means 56 is mounted on the end portion (free portion) 521 of the cantilever beam 52 (namely, the motion output means 56 is mounted with its central line aligned with the motion output point O), the present invention is not limited to this, and the motion output means 56 may be mounted on a location shifted from the end portion 521 toward the other end portion 522 by a certain distance otherwise. For example, the motion output means 46 may be mounted with its central line aligned with motion output points O' or O". Thus, a precision motion transducer with a much higher conversion ratio can be obtained, so as to perform a much more precise positioning control.

It should be noted that the present invention is not restricted to the above embodiments, contrarily, as long as within the scope defined by the appended claims, various design changes may be made. For example, a plurality of precision motion transducers according to the present invention may be assembled such that, for example, the motion output means of a first precision motion transducer is used as the motion input means of a second precision motion transducer, so as to attain a precision motion transducer assembly with an even higher motion conversion ratio. It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. A precision motion transducer, comprising:
    a first elastic body with a first modulus of elasticity, provided with a first end and a second end;
    a second elastic body with a second modulus of elasticity which is larger than the first modulus of elasticity, the second elastic body being provided with a fixed portion and a free portion, the free portion being attached to the second end of the first elastic body;
    a fixing means for fixing the fixed portion of the second elastic body to a base;
    a motion input means for inputting motion inputs to the first end of the first elastic body; and
    a motion output means provided at a location where the first elastic body and the second elastic body are connected with each other for outputting motion outputs which are converted from the motion inputs according to an elasticity ratio between the modulus of elasticity of the first elastic body and the modulus of elasticity of the second elastic body, wherein the free portion of the second elastic body is directly attached to the second end of the first elastic body.

2. The precision motion transducer of claim 1, wherein the second elastic body is an ends-fixed beam, wherein a central portion of the ends-fixed beam is the free portion, and two end portions of the ends-fixed beam are the fixed portions, the second modulus of elasticity referring to a modulus of elasticity of the central portion with respect to the two end portions.

3. The precision motion transducer of claim 1, wherein the first elastic body is a spring.

4. The precision motion transducer of claim 1, wherein the motion input and/or the motion output are linear motions.

5. The precision motion transducer of claim 1, wherein the motion input means includes a micrometer.

6. The precision motion transducer of claim 1, wherein the motion input means includes a motor.

7. The precision motion transducer of claim 1, wherein the motion input means includes a piezo-actuator.

8. The precision motion transducer of claim 1, wherein the motion input means includes a voice coil.

9. The precision motion transducer of claim 1, wherein the motion input means includes a hydraulic linear actuator.

10. The precision motion transducer of claim 1, wherein the motion input means includes an air linear actuator.

11. The precision motion transducer of claim 1, further comprising: a motion output feedback device for monitoring the motion output and transmitting a feedback signal corresponding to the motion output.

* * * * *